Nov. 28, 1933.    R. B. FAGEOL    1,936,834
DEVICE FOR INTERCONNECTING AXLES AND SPRING SUSPENSION
Original Filed Dec. 3, 1929    2 Sheets-Sheet 1

Inventor
Rollie B. Fageol
By Strauch & Hoffman
Attorneys

Nov. 28, 1933.     R. B. FAGEOL     1,936,834
DEVICE FOR INTERCONNECTING AXLES AND SPRING SUSPENSION
Original Filed Dec. 3, 1929     2 Sheets-Sheet 2
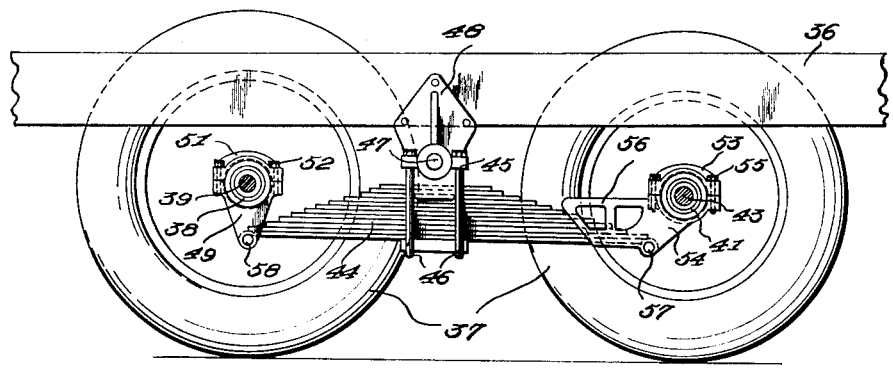
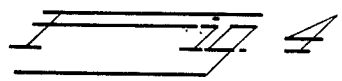
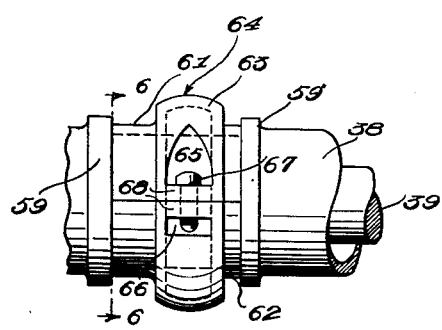     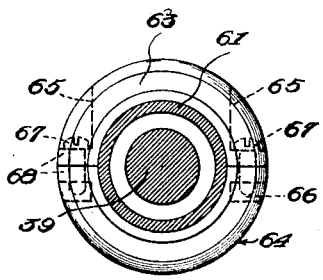
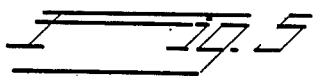     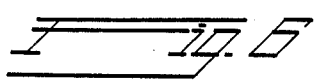
Inventor
Rollie B. Fageol
By Strauch & Hoffman
Attorneys Patented Nov. 28, 1933

1,936,834

UNITED STATES PATENT OFFICE 1,936,834

DEVICE FOR INTERCONNECTING AXLES AND SPRING SUSPENSION

Rollie B. Fageol, Los Angeles, Calif., assignor, by mesne assignments, to Automotive Engineering Corporation, a corporation of Delaware Application December 3, 1929, Serial No. 411,305
Renewed April 8, 1933

5 Claims. (Cl. 280—124)

This invention relates to means for flexibly interconnecting the axles and spring suspensions of motor road vehicles. It represents a continuation in part of my copending applications S. Nos. 208,369, filed July 25, 1927, 36,543, filed June 11, 1925, and 383,414, filed August 3, 1929.

The first one of said copending applications is in turn a division of my application, S. N. 51,243, filed November 2, 1921, now Patent No. 1,660,188, granted February 21, 1928.

In road vehicles, particularly in those of the type disclosed in the above-mentioned applications, it is essential in order that destructive shocks be not transmitted to the frame or through the running gear, that each axle be resiliently and flexibly connected to the frame and capable of freedom of movement in every direction permitted by said resilient connections. Otherwise the normal action of the spring is restricted and shocks are set up which not only cause unsatisfactory riding conditions when the construction is used in buses and pleasure vehicles but also rapidly destroy the life of the running gear. Various types of flexible spring suspensions have been designed, but in such constructions it has been common practice to connect the springs to the frame and axles in such manner that the latter are not free to tilt in transverse vertical planes without setting up undue stresses and influence upon the springs in the running gear. That is to say, as a wheel of the vehicle passes over any road irregularity, the corresponding end of the axle rises or falls with respect to the chassis frame and this rising and falling movement is limited by the extent that the corresponding springs of the suspension are able to twist about their longitudinal axes. It results that, when violent shocks are transmitted to the axles, the individual springs or other portions of the spring suspension are liable to be broken or damaged.

Accordingly, a primary object of this invention is to provide a device for interconnecting the axles and spring suspension of road vehicles in such manner that the axles are free to tilt in transverse planes without imposing substantial twisting stresses on the suspension.

More specifically, it is an object to provide, adjacent the ends of the axles, spherical bearing surfaces to receive hangers which support the end of the spring. In this connection it is an important object to so design the spherical surfaces and hangers that either or both may be readily and conveniently attached to or detached from the axle.

Further objects of the invention will appear as a description of the invention proceeds with reference to the accompanying drawings, in which:

Figure 2 is a vertical section through one of the hangers and the axle upon which it is mounted, showing the detailed construction and arrangement of the hanger and the manner in which the springs are connected thereto.

Figure 3 is a vertical section through the hanger on a plane at right angles to that on which Figure 2 is taken.

Figure 1:
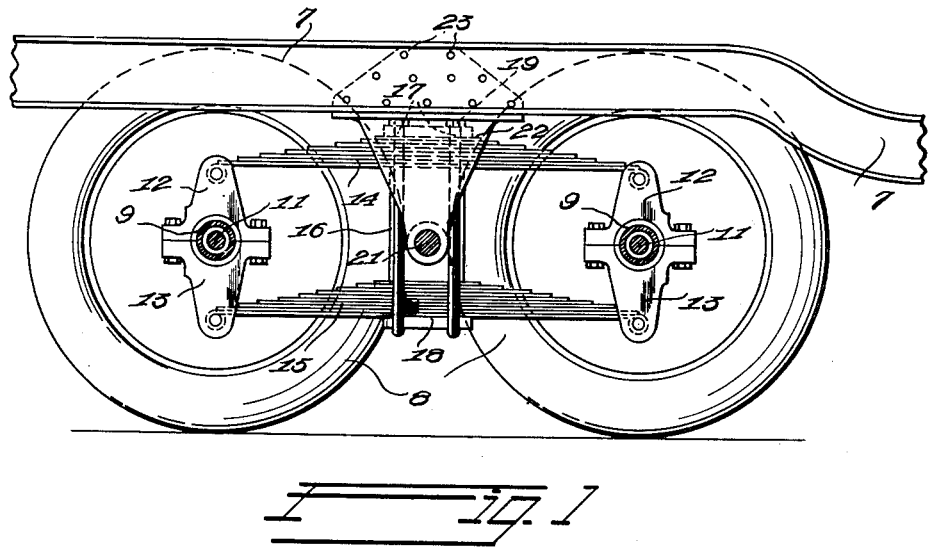
Figure 1 is a vertical longitudinal sectional view taken on a plane cutting the axles immediately adjacent the frame on the inner side thereof.

Figure 4, representing a modified form, is a vertical longitudinal sectional view taken on a plane cutting the axles immediately adjacent the wheels on one side thereof.

Figure 5, showing several details of the device illustrated in Figure 4, is a broken side elevational view of the drive axle housing showing the association therewith of a ball hanger seat adapted to receive a hanger for connecting the frame to the axle.

Figure 6 is a transverse sectional view on a plane represented by line 6—6 of Figure 5.

The two forms of this invention are illustrated in connection with two different types of multi-wheel road vehicles embodying tandem axles and spring suspensions, as shown in Figures 1 to 3 and 4 to 6 respectively. The first form will now be described, like reference characters indicating like parts throughout the several figures.

With reference to Figure 1 numeral 7 designates one end of the chassis frame of a road vehicle. Beneath this frame are disposed closely spaced wheels 8 which support a pair of axle housings 9. Each housing 9 is adapted to receive an axle shaft 11, but it should be understood that said housings may comprise conventional dead axles without the reception of any driving elements. The axle housings 9 are spaced from each other at each side of the vehicle by an upper spring 14 and a lower spring 15, the ends of which are connected to and supported by a pair of ball hangers, each of which comprises a pair of sections 12 and 13 and is mounted upon one of the axles in a manner later to be described. A block 16 is disposed between the springs 14 and 15 intermediate the ends thereof and is rigidly secured with respect thereto by a pair of long U-bolts 17, the threaded ends of which pass through a clamping plate 18 and are secured in position by nuts 19 which engage said plate.

Block 16 is supported upon a transverse trunnion shaft 21 which in turn is carried by bracket 22. The latter depends from the frame and is rigidly secured thereto by riveting as at 23. It will thus be seen that the wheels 8, together with the axle housing 9 and the springs 14 and 15, oscillate as a body about the axis of the trunnion shaft 21 as the vehicle passes over road irregularities.

Figures 2, 3:
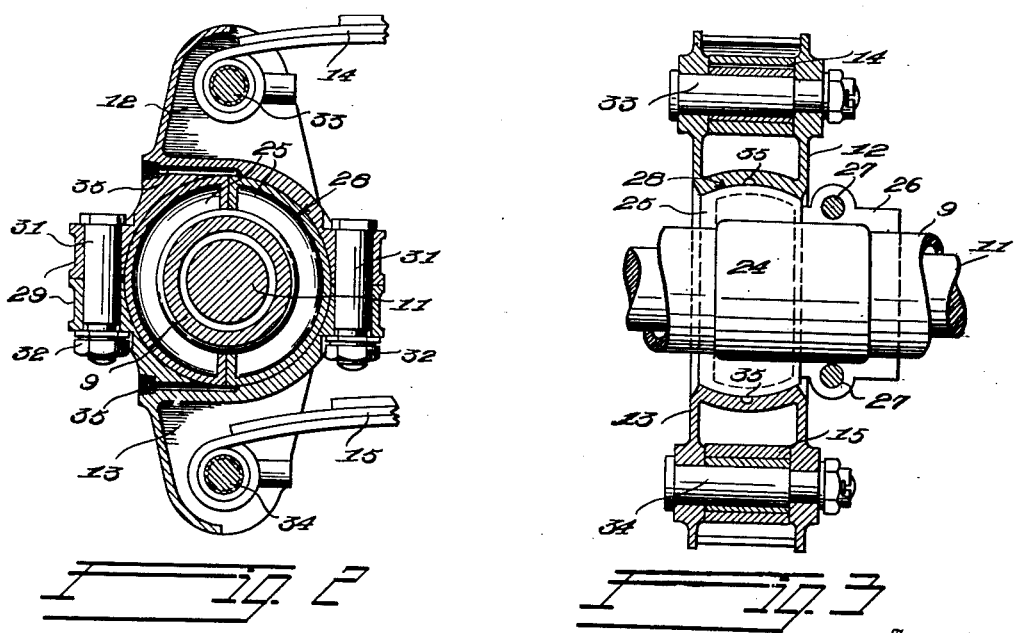

Details of construction of the hangers and the manner in which they are connected between the springs and the axle housing will best be observed by reference to Figures 2 and 3. Each end of each axle housing 9 is enlarged as at 24 to receive a pair of ball sections 25, each of which is provided with a substantially semi-cylindrical extension 26. The extensions 26, and hence the ball sections 25, are thrown together by bolts 27 (Figure 3). The enlargement 24 prevents longitudinal movement of the ball section with respect to the axle housing 9 and bolts 27 prevent rotational movement of said sections with respect to said housing. The combined peripheral surfaces of the ball sections 25 form a spherical surface 28 upon which is mounted an upper hanger element 12 and a lower hanger element 13. These hanger elements are provided with laterally extending lugs 29 through which pass pins 31 having threaded ends upon which nuts 32 are secured for locking the hanger elements together upon the ball seat. As illustrated, the interior of the hangers are shaped to provide a spherical surface for sliding movement upon the ball surface 28. The upper hanger element 12 receives an end of spring 14 which latter is maintained in position therein by a horizontal transverse pin 33. A similar horizontal pivot pin 34 is provided in the lower hanger element 13 to receive the ends of springs 15. Each of the hanger elements is provided with a lubricating duct 35 through which oil may be fed to the ball surface.

From the foregoing description, it will be seen that since the ball hanger elements are universally mounted upon the ball member formed by sections 25 carried by the axle housings 9, the axle housings are permitted to tilt in transverse vertical planes as the vehicle passes over road irregularities without twisting the springs or damaging any of the other parts of the suspension. Since the balls and hangers are made up of separable parts, they may readily be assembled upon any conventional axle housing and they may readily be disassembled and assembled for service and replacement.

The form shown in Figures 4-6 inclusive, is taken from my copending application S. N. 383,-414, above mentioned. In this embodiment a single leaf spring is employed but it will be apparent from the following description that many of the details and principles are equally applicable to the device shown in Figures 1-3 inclusive as well as to other forms which fall within the scope of the invention. As shown in Figure 4, a pair of ground engaging wheels 37 are disposed adjacent one end of a chassis frame 36. One of these wheels supports an end of an axle housing 38, in which is disposed a live axle 39, and the other wheel supports an axle housing 41 within which is disposed a dead axle 43; but it will be understood, as far as this invention is concerned, that the character of the axle sections within the housings is immaterial. A standard leaf spring 44 is pivotally secured intermediate its ends, by means of an eye-member 45 disposed between the spring leaf securing U-bolt 46, to the projecting end of a transversely disposed trunnion shaft 47, which shaft is supported adjacent a projecting end thereof in a bracket 48 rigidly secured to the side of the frame member 36.

The forward end of the spring is connected to axle housing 38 by means of a ball hanger which comprises a body portion 49 and a cap portion 51 secured together by bolts 62, said ball hanger having universal connection with a ball seat, hereinafter described, for permitting vertical universal oscillation of the opposite end of axle 38 without undue strain on the spring assembly. The opposite or rear end of the spring is connected with axle 41 in a similar manner, the hanger for this spring comprising a cap portion 53 and a body portion 54, which body portion includes a longitudinal extension 56 in order to dispose axle 41 at a greater distance from trunnion shaft 47 than axle 38, while utilizing a standard leaf spring. The extension 56 of body 54 receives one end of spring 44 and is provided with a pintle 57 upon which is pivoted the eye of the adjacent end of the spring. In like manner, the lower end of the body 49 of the forward hanger carries a pintle 58 which passes through the adjacent eye of the forward end of spring 44.

The seats provided upon the axle housing for receiving the hangers are illustrated in detail in Figures 5 and 6. All of the seats are substantially identical in construction and the one on the forward end of the axle housing will be described.

Axle housing 38 is provided at one end with a pair of flanged shoulders 59. These shoulders are spaced from each other to receive the extensions 61 and 62 respectively of a ball seat member 63. As indicated, the ball seat member 63 is made up of a pair of complemental sections, the combined peripheral surface of which exclusive of extensions 61 and 62, form a spherical seating surface 64.

In order to secure the sections of the ball seat 63 in engagement, and to obviate any danger of injury to the hangers supported on the seat in the event of displacement of the securing means, the sections are preferably secured in contacting engagement by a pair of diametrically disposed bolts 67 detachably engaged in mating apertures in flanges 68 of the sections, which flanges are defined by cutting back as indicated at 65 and 66, whereby the bolts 67 are disposed substantially inwardly of the ball surface, thereby substantially minimizing the danger of contact between the bolts and the bearing surfaces of the hangers in the event that the bolts become loosened.

It will be observed that the form of the invention just described functions in substantially the same manner as that disclosed in Figures 1-3. The ball hanger construction permits universal movement of the axles with respect to the frame and the axle housings may freely tilt in transverse vertical planes without twisting or damaging the elements of the spring suspension.

It will also be observed that in both embodiments of the invention, due to the fact that the hangers maintain the ends of the springs offset from the axles, the axles are not confined to swinging movement in fixed paths about the trunnion axis. This is especially true when the hangers are arranged as in Figure 4. Hence, in these multi-wheel constructions, any desired type of driving mechanism, radius rods or torquing devices may be employed to regulate movement of the axles as they swing and tilt when the vehicle passes over road irregularities. No driving connections, or radius or torque rods, are shown for the reason that such devices form no part of the present invention and are not included in the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:

1. In combination with a road vehicle axle, a ball seat member carried on said axle, a hanger seated upon said ball seat member for universal movement with respect thereto, said hanger having a downwardly extending arm designed to pivotally receive an element of a spring suspension at a point materially and substantially directly below the axis of said axle.

2. In combination, an axle provided with a relatively immovable shoulder, a detachable bearing member comprising a pair of complemental sections, said sections being clamped together in engagement with said axle and said shoulder to prevent rotary and axial movement of said member relative to said axle, and a hanger universally mounted on said bearing member.

3. In a hanger and bearing assembly designed to flexibly interconnect an axle with a spring suspension, a bearing member for detachable connection with the axle and a hanger designed for universal movement on the bearing member; said member comprising a pair of complemental semi-spherical sections provided with complemental recesses in their semi-spherical surfaces, and securing elements for uniting said sections, said securing elements being disposed wholly within said recesses.

4. In combination with a road vehicle axle and a suspension beam, a ball seat member carried on said axle; and a suspension hanger freely and universally mounted upon said ball seat member; said hanger comprising a relatively elongated arm projecting downwardly from the axle and provided at its free end with means for pivotally receiving an end of said beam and thereby freely suspending a load, and a cap member complemental to and united with said arm; said cap member being free of external connections and pivots, and said arm including a rigid stabilizing element extending longitudinally of said seat beyond the said means that pivotally receives the end of said beam.

5. In combination with a vehicle axle and a suspension beam, a ball seat member carried on said axle; and a suspension hanger freely and universally mounted upon said ball seat member; said hanger comprising an arm projecting downwardly from the axle and provided with extension means for receiving and supporting an end of said beam and thereby suspending a load, said extension means comprising a rigid stabilizing element overlapped longitudinally of an appreciable portion of said end of the beam, and a cap member complemental to and united with said arm.

ROLLIE B. FAGEOL.